Feb. 18, 1930.  G. A. SANGUINETTI  1,747,488
TRACTOR TREAD
Filed Oct. 31, 1927
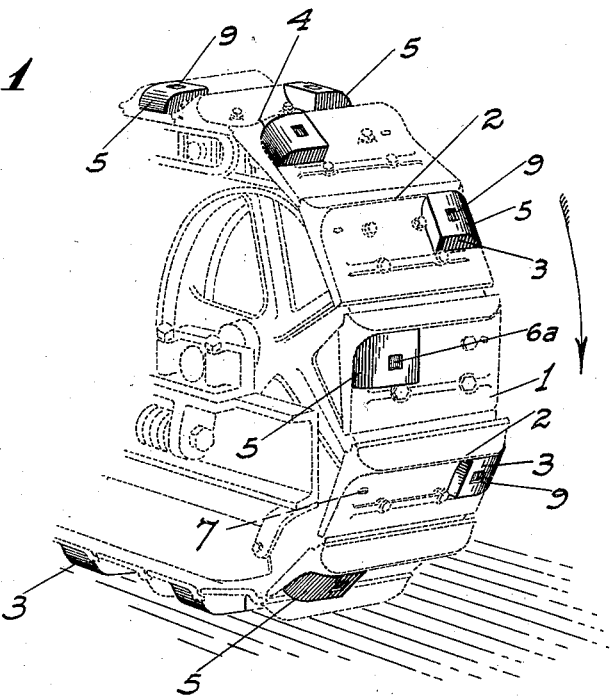
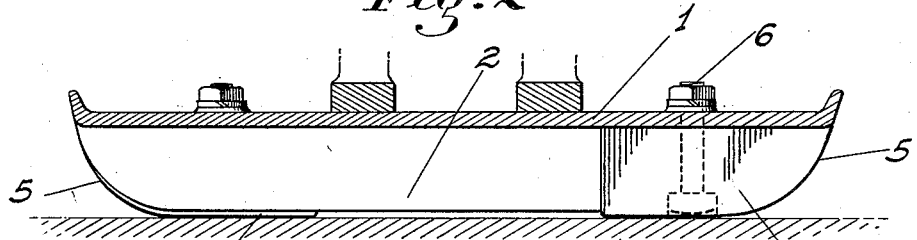
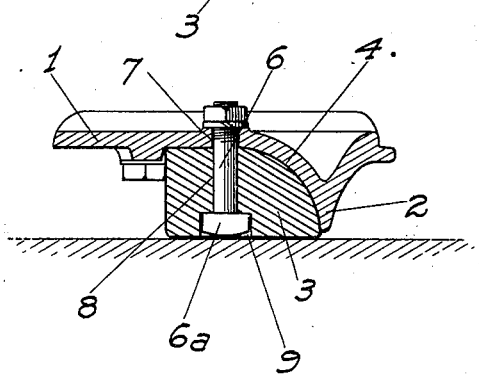
INVENTOR
Geo. A. Sanguinetti
BY
ATTORNEY Patented Feb. 18, 1930

1,747,488

UNITED STATES PATENT OFFICE

GEORGE A. SANGUINETTI, OF PETERS, CALIFORNIA

TRACTOR TREAD

Application filed October 31, 1927. Serial No. 229,903.

This invention relates to devices for attachment to the ground bearing treads or shoes of tractors, which shoes have outwardly projecting grousers or cleats formed thereon for gripping engagement with soft ground. Such cleats are very necessary when the tractor is operating in ground of this character, but become a detriment when the machine is traveling over hard surfaced roads, since the cleats tend to cut into and destroy the surface of the road. This is especially true when the tractor is being turned, the cleats exerting a very bad lateral abrasive or gouging action on the road surface.

The principal object of my invention therefore is to provide attachments for application to the shoes or tread of a tractor so constructed and arranged as to prevent the cleats from thus cutting into hard ground and to provide a smooth flat contacting surface with the ground so that the turning of the tractor is facilitated without danger of damaging the road.

My improved attachments, which are particularly intended to be applied to a tractor when the latter is to travel over roads, need however never be removed even when the tractor again works in soft ground, since an effective grip on the ground will still be maintained.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Fig. 1 is a perspective outline of a portion of the tread of a tractor of the endless track type, showing my improved ground bearing attachments applied thereto.

Fig. 2 is a transverse section of a tread shoe showing my attachments as arranged in connection therewith.

Fig. 3 is a longitudinal section of a shoe and its attachment.

Referring now more particularly to the characters of reference on the drawings, the ground bearing shoes or tread members of a standard tractor of the endless track type comprise substantially flat plates 1 each having a transversely extending cleat or grouser 2 projecting outwardly therefrom adjacent one end. These cleats are comparatively narrow and when engaged with a road surface support the weight of the tractor and tend to dig into the road as will be evident.

My improved ground bearing attachments comprise blocks 4, of a lesser width and length than the shoes and adapted to be disposed in transversely staggered relation on alternate shoes of the tread through the length thereof. Each block is disposed on its shoe behind the cleat, relative to the direction of travel of the machine and abuts against said cleat; the side of the block adjacent the cleat having a curvature the same as that of the cleat as shown at 4, so as to bear snugly thereagainst for its full height. The blocks are substantially the same height as the cleats, and while they may be slightly greater in height they should never in any event be of a lesser height.

The blocks are also disposed so that one side extends to a side edge of the tread, and said side is rounded toward the outer or ground bearing face of the block, as shown at 5. The blocks are mounted in place by bolts 6 placed through holes 7 already provided in the shoe plates, and through holes 8 bored through the blocks, the outer ends of the blocks always being countersunk as at 9 to receive the heads 6ª of the bolts. The blocks are formed right and left hand so as to permit them to be mounted in the desired staggered relation, while maintaining the curved sides facing the adjacent side edges of the shoes.

By reason of this construction and arrangement it will be seen that the weight of the tractor is supported by the flat surfaced blocks instead of by the cleats, and the latter are thus held from engagement with the ground. When turning corners the outer curved sides of the blocks permit the same to slide laterally without any tendency to dig into the ground. Since the rear transverse edges of the blocks are at right angles to the shoes, and since the working sides of the cleats are not covered by said blocks for their full extent, the tractor will not lose any of its ground gripping efficiency when operating in soft ground. The shoes bearing snugly against the cleats, there is no tendency to shear off the holding bolts and if the latter are once properly tightened up the tractor may be operated indefinitely without any tendency for the bolts to break or loosen up developing.

While I have shown and described my attachments as being applied to an endless track tread, it will be evident that they may be used with equally good results on wheel tractors as well.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

In a tractor tread structure comprising tread plates having transverse cleats projecting outwardly therefrom, blocks of considerably lesser width than the plates and of not lesser height than the height of the cleats, projecting outwardly from the plates adjacent the cleats, said blocks being arranged in alternately staggered relation transversely of the tread and disposed adjacent the side edges of the plates, whereby to enable said blocks to be relatively narrow compared to the total width of the plates and cleats while still maintaining the stability of the structure when supported on the blocks.

In testimony whereof I affix my signature.

GEORGE A. SANGUINETTI.